June 15, 1965 W. KASTEN 3,189,182
FUEL FILTER WATER SEPARATOR ELEMENT
Filed Aug. 27, 1962 2 Sheets-Sheet 2
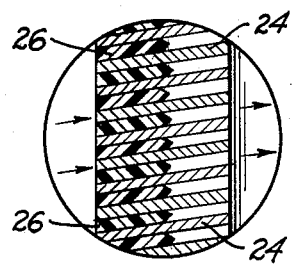
FIG_2
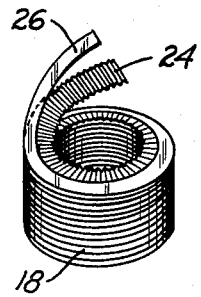
FIG_3
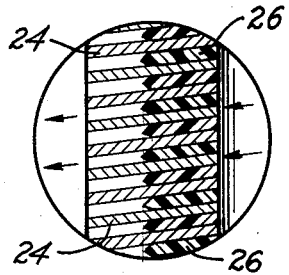
FIG_4
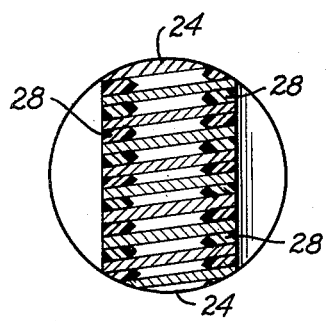
FIG_5
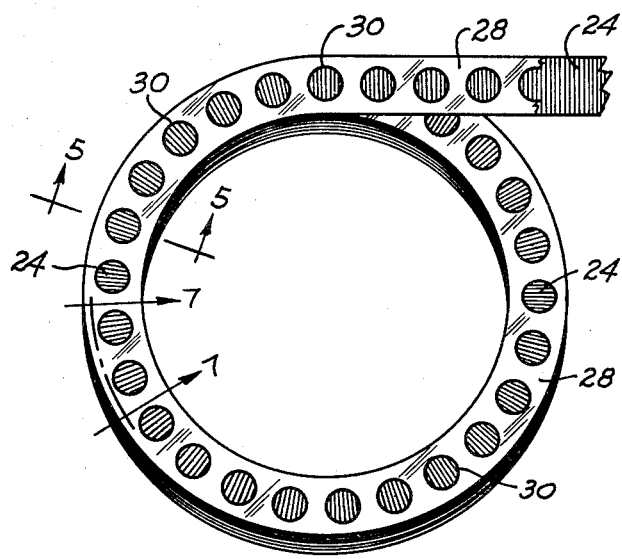
FIG_6
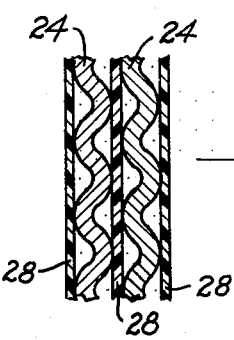
FIG_7
FIG_8
INVENTOR.
WALTER KASTEN.
BY
*William N. Antonis*
ATTORNEY.

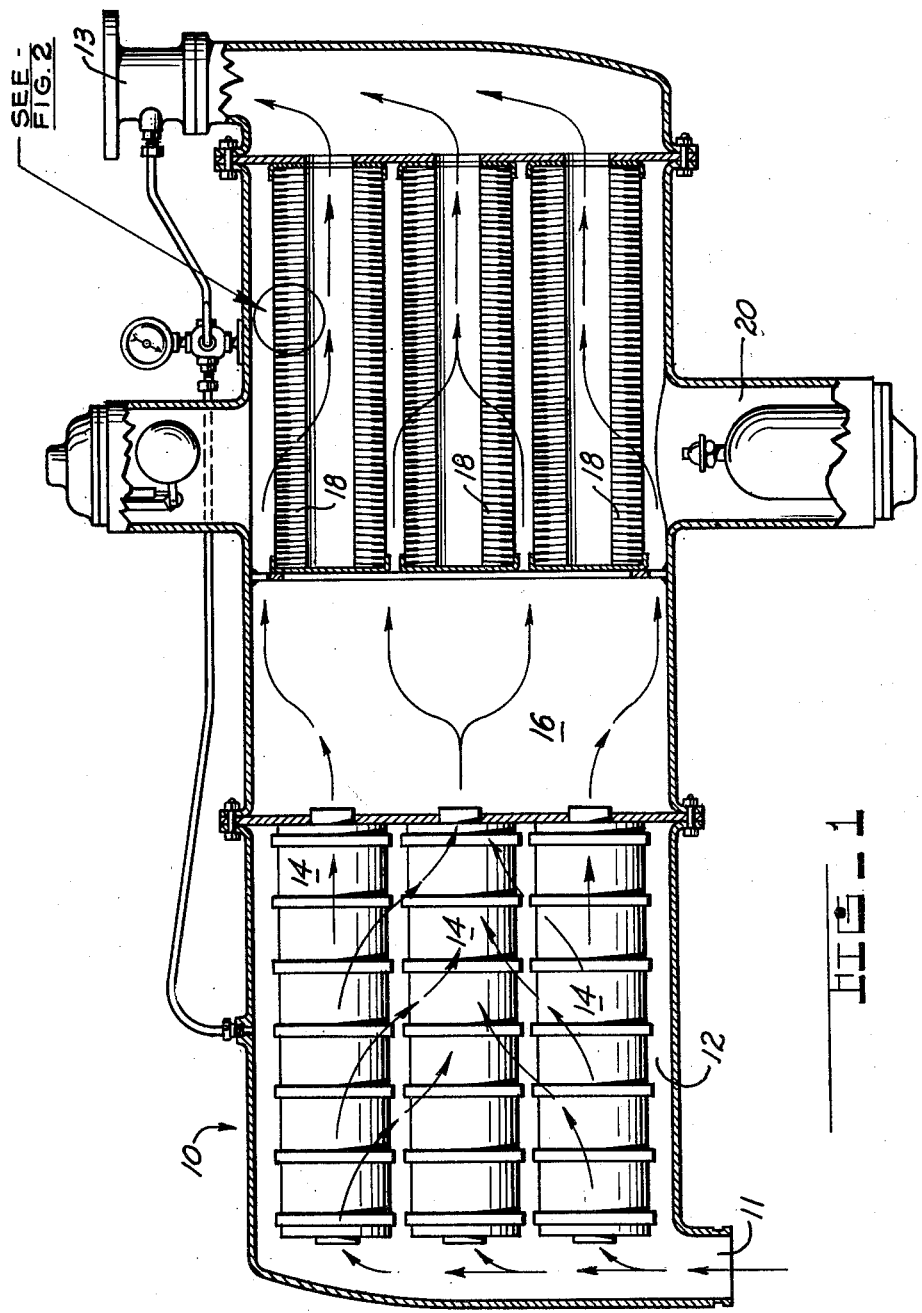

United States Patent Office 3,189,182
Patented June 15, 1965

3,189,182
FUEL FILTER WATER SEPARATOR ELEMENT
Walter Kasten, Madison Heights, Mich., assignor to The Bendix Corporation, a corporation of Delaware
Filed Aug. 27, 1962, Ser. No. 219,685
4 Claims. (Cl. 210—492)

This invention relates to fuel filter water separator devices and more particularly to edge-type ribbon elements which may be used as separator elements in the second stage of a fuel filter water separator device.

At present Teflon coated wire mesh screens are commonly used in filter water separator devices to separate water droplets from fuels. Such water barriers are usually formed into cylindrical tubes by wrapping the Teflon coated wire mesh screen around a suitable core. The wire mesh screen is then side seamed and the ends are bonded with epoxy type or other suitable cements. Although such Teflon coated wire mesh screens are very effective, they are also very costly to make, since the Teflon solution must be sprayed onto both sides of the wire mesh and baked at relatively high temperatures in the 600° F. range. Furthermore, handling of the wire mesh screen, while it is being fabricated into a cylinder and subsequently assembled into a housing, often results in certain areas of the coating being damaged or scraped off. Such loss of the Teflon coating will expose the bare wire mesh and will render such area useless as water barriers, since without the Teflon coating they are no longer hydrophobic.

Accordingly, it is an object of this invention to provide a hydrophobic cylinder which can be more economically manufactured and which will not be subject to damage of the type described above.

Another object of this invention is to provide an edge-type porous tubular element which has the upstream surface thereof rendered hydrophobic so that flow of fuel therethrough will be permitted but flow of any water droplets therethrough will be prevented.

More specifically, it is an object of this invention to provide a separator element for use in the second stage of a fuel filter water separator comprising a plurality of axially aligned convolutions of a resin impregnated ribbon material which are bonded together by the resin, said ribbon material having transversely arranged rugosities in the surfaces thereof for forming radially extending pores between the convolutions which permit flow of fluid therethrough, and a strip of hydrophobic material, such as Teflon, interposed between said convolutions for preventing the passage of water droplets through the pores.

Another and important object of this invention is to provide a porous ribbon-type element having radially extending pores of substantial uniformity throughout the entire element, which uniformity is achieved by interposing between the convolutions of fibrous ribbon material having opposed uneven surfaces, a continuous strip of non-fibrous material having opposed smooth surfaces.

The above and other objects and features of the invention will become apparent from the following description of the mechanism taken in connection with the accompanying drawings which form a part of this specification and in which:

FIGURE 1 is a view partially in section of a filter water separator incorporating my invention;
FIGURE 2 is an enlarged section of the circumscribed portion of FIGURE 1;
FIGURE 3 is a perspective view with portions thereof unwound for clarity;
FIGURE 4 is a view similar to FIGURE 2 showing a variation in the construction of the separator element shown in FIGURE 1;
FIGURE 5 is another view similar to FIGURE 2 showing a further variation in the construction of the separator element shown in FIGURE 1, said section being taken along line 5—5 of FIGURE 6.
FIGURE 6 is a plan view of the variation shown in FIGURE 5 with a portion thereof unwound for clarity;
FIGURE 7 is a greatly enlarged fragmentary section taken along line 7—7 of FIGURE 6; and
FIGURE 8 is a greatly enlarged section of a Teflon coated wire.

Referring to FIGURE 1, it will be noted that the numeral 10 indicates a fuel filter water separator which includes an inlet port 11 and an outlet port 13, a first stage 12 containing a plurality of coalescer elements 14 and a second stage 16 containing a plurality of filter separator elements 18. The coalescer elements 14 may include resin bonded densely compressed layers of fine glass fibers and other filter media or any suitable combination of materials capable of normaly retaining solid contamination down to a fraction of a micron and coalescing emulsified fuel water mixtures into relatively large droplets of water and clean water-free fuel. These large droplets of water sink to the water sump 20 and also carry with them traces of extremely fine solids. Both the water and the very fine solids are discharged through a float controlled water drain valve which is located in the water sump, but is not shown. Before reaching the outlet port 13 the fuel passes through separator elements 18 which prevent the passage of any water droplets and solid contaminants that may have reached these elements. Thus, elements 18 normally only permit the passage of clean water-free fuel therethrough.

The separator element 18 consists of layers or convolutions 24 helically wound to form the side walls of the element, said layers having radial pores therebetween to provide passages for the fluid flowing therethrough. The layers 24 of the element may be formed from paper, cellulose, or fibrous material held together by a discontinuous bond so distributed that radial pores are formed between the layers at frequent intervals. The discontinuity of the bond may be controlled by using material, having a predetermined rugosity on both surfaces thereof, so that the valleys of the rugosities form the passages and the peaks thereof form the points of contact between the adjacent layers. The material used is preferably treated before the element is formed with a thermosetting resinous substance such as a phenolic formaldehyde condensation product, in order to render the material substantially non-hygroscopic. After the element has been formed, it is heated to a temperature and for a time sufficient to cause the resinous substance to set. After the resinous substance has set, the material forming the layers of the element becomes impervious to fluid. However, the element itself is pervious, since the pores between the layers remain open after the treatment.

In the fabrication of the element, ribbon or ribbon-like material, having a width substantially equal to the thickness of the final element wall, is wound edgewise to form a cylindrical member, which is thereafter cut to the desired length. The method for winding and making such an element is disclosed and claimed in my Patent No. 2,421,704, issued June 3, 1947.

In order to render the upstream surface of the above described porous edge-type element 18 hydrophobic so that passage of water droplets therethrough will be prevented, a thin strip of hydrophobic material 26 is interposed between the convolutions or layers 24 near the outside surface of the element wall. The hydrophobic material 26, which may be a Teflon, Kel-F, Mylar or polyester tape, should have a surface area which is less than the surface area of the resin impregnated ribbon material 24 so that bonding of adjacent convolutions of the ribbon material 24 will not be prevented. Preferably, the width of the hydrophobic tape 26 will be approximately one-half the width of the resin treated ribbon 24. The ribbon material 24 and the hydrophobic tape 26 are wound simultaneously so that the finished element consists of alternate layers of material. The method of forming an element having alternate layers of material, as discussed above, is disclosed in my Patent No. 2,647,976, issued August 4, 1953.

Since hydrophobic tapes, such as Teflon, Mylar, etc. are basically soft-gasket-like materials, which, if too thick, would embed themselves into the crevices of the crepe ribbon material 24 and thus seal the pores of the separator element 18, it has been found that the thickness of the hydrophobic tape used should be less than one-half the depth of the rugosities formed in the surface of the resin impregnated ribbon material. For example, where the crepe ribbon material 24 has a thickness of about .010" with crevices of about .005" deep, a Teflon tape of about .001" to .002" thickness has been found to be suitable to prevent excessive reduction of pore size.

If the separator element 18 is used for outside-in flow, the hydrophobic tape 26 should be placed so that one edge thereof is even with or protrudes slightly from the outer diametrical surface of the element, as shown in FIGURES 1, 2 and 3. However, where flow normally occurs from the inside to the outside, the hydrophobic tape 26 should be placed so that one edge thereof is even with or protrudes slightly from the inner diametrical surface of the element, as shown in FIGURE 4. Where it is desirable to have a separator element 18 which is capable of flow in either direction (inside out or outside in), the hydrophobic tape 28 could be of substantially the same width as the resin impregnated ribbon 24, provided the tape 28 is perforated, as shown in FIGURES 5 and 6, so that bonding between adjoining convolutions of ribbon 24 could occur at each perforation 30 of the hydrophobic tape 28. Such an arrangement would have the added advantage of locking the hydrophobic tape more securely in place. In each of these variations it will be noted that one edge of the hydrophobic tape 26 or 28 is substantially congruent with the upstream edge of the separator element 18.

Another purpose and advantage of using a tape 26, such as Teflon or Mylar, between the adjacent convolutions of the ribbon 24 is that it will result in a ribbon-type element having radially extending pores of substantial uniformity. The reason for this is because tapes formed of Teflon, Kel-F, Mylar, etc., which have opposed smooth surfaces, are in contact with the uneven surfaces of the resin impregnated ribbon. The interposition of such a non-fibrous tape, therefore, will result in a certain predictable uniformity in the pores since it serves as a spacer and prevents the random arrangement of the adjacent ribbon convolutions. For example, with the smooth non-fibrous tape between the ribbon convolution the peaks of one ribbon convolution cannot nest in the valleys of the adjacent ribbon convolution, nor can the other extreme occur where the peaks of one ribbon convolution contact only the peaks of the adjacent ribbon convolution. Thus, with the tape spacer between the ribbon convolutions, the size of the pores will be determined mainly by the crepe of the ribbon and not by the random arrangement of the adjoining layers. Obviously, such a construction will eliminate possible uncontrollable detrimental variations in pore size at various points of the element which are the result of pure chance.

Those acquainted with this art will readily understand that the invention herein set forth is not necessarily limited and restricted to the precise and exact details presented and that various changes and modifications may be resorted to without departing from the spirit of my invention. For example, instead of using a hydrophobic tape, a Teflon coated wire 34, preferably of a rectangular cross section as shown in FIGURE 8 could be used in place thereof with comparable results. Accordingly, applicant does not desire to be limited to the specific details described herein, primarily for purposes of illustration, but instead desires protection falling within the scope of the appended claims.

Having thus described the various features of the invention, what I claim as new and desire to secure by Letters Patent is:

1. In a fuel filter water separator device a porous separator element for permitting flow of fuel therethrough but preventing flow of any water droplets therethrough comprising a plurality of axially aligned continuous convolutions of a resin impregnated fibrous ribbon material which are bonded together by said resin to form a hollow tubular member, radial pores located between said convolutions and extending from the hollow interior of said member to the outside surface thereof, and a continuous Teflon coated wire embedded between said convolutions for preventing the passage of water droplets through said pores.

2. In a fuel filter water separator device a porous separator element, as defined in claim 1, wherein said Teflon coated wire has a rectangular cross section.

3. In a fuel filter water separator device a porous separator element for permitting flow of fuel therethrough but preventing flow of any water droplets therethrough comprising a plurality of axially aligned convolutions of a resin impregnated ribbon material which are bonded together by said resin, said ribbon material having transversely arranged rugosities in the surfaces thereof for forming radially extending pores between said convolutions which permit flow of fluid therethrough, and a strip of hydrophobic material interposed between said convolutions for preventing the passage of water droplets through said pores, said hydrophobic material having a thickness which is less than one-half the depth of the rugosities formed in the surfaces of the resin impregnated ribbon material.

4. In a fuel filter water separator device a porous separator element, as defined in claim 3, wherein the width of said hydrophobic material is substantially the same as the width of said ribbon material, said hydrophobic material having a plurality of holes located therein at predetermined intervals.

References Cited by the Examiner

UNITED STATES PATENTS

| | | | |
|---|---|---|---|
| 2,375,246 | 5/45 | Kasten | 210—488 |
| 2,583,423 | 1/52 | Hallinan | 210—488 X |
| 2,601,521 | 6/52 | Heftler | 210—488 |
| 2,873,030 | 2/59 | Ashton | 210—492 X |
| 3,034,656 | 5/62 | Kasten | 210—497 X |
| 3,117,925 | 1/64 | Kasten | 210—497 X |

REUBEN FRIEDMAN, *Primary Examiner.*

HERBERT L. MARTIN, HARRY B. THORNTON,
*Examiners.*